US008436499B2

(12) United States Patent
Zhang et al.

(10) Patent No.: US 8,436,499 B2
(45) Date of Patent: May 7, 2013

(54) ELECTRICAL MACHINE WITH SUPERCONDUCTING ARMATURE COILS AND OTHER COMPONENTS

(75) Inventors: Tao Zhang, Niskayuna, NY (US); Evangelos Laskaris, Niskayuna, NY (US); Manoj Shah, Niskayuna, NY (US); James Bray, Niskayuna, NY (US); Kiruba Sivasubramaniam Haran, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 22 days.

(21) Appl. No.: 13/094,853

(22) Filed: Apr. 27, 2011

(65) Prior Publication Data

US 2011/0285219 A1 Nov. 24, 2011

(51) Int. Cl.
*H02K 9/00* (2006.01)
(52) U.S. Cl.
USPC .............................................. 310/52; 310/54
(58) Field of Classification Search .............. 310/52–64, 310/201; 505/166
See application file for complete search history.

(56) References Cited

U.S. PATENT DOCUMENTS

| | | | |
|---|---|---|---|
| 4,058,746 A * | 11/1977 | Mole et al. | 310/10 |
| 5,289,150 A * | 2/1994 | Rabinowitz | 335/216 |
| 5,777,420 A | 7/1998 | Gamble et al. | |
| 6,278,212 B1 | 8/2001 | Kalsi | |
| 6,347,522 B1 | 2/2002 | Maguire et al. | |
| 6,359,365 B1 | 3/2002 | Kalsi | |
| 6,376,943 B1 | 4/2002 | Gamble et al. | |
| 6,489,701 B1 | 12/2002 | Gamble et al. | |
| 6,674,206 B2 * | 1/2004 | Maguire et al. | 310/179 |
| 7,088,020 B2 * | 8/2006 | Holly et al. | 310/52 |
| 7,397,142 B1 | 7/2008 | Cooper | |
| 7,566,684 B1 * | 7/2009 | Levin et al. | 505/430 |
| 2004/0021382 A1 * | 2/2004 | Steinmeyer | 310/90.5 |
| 2009/0093369 A1 | 4/2009 | Kwon et al. | |
| 2009/0186769 A1 | 7/2009 | Bray et al. | |

FOREIGN PATENT DOCUMENTS

| | | |
|---|---|---|
| CN | 2558154 | 6/2003 |
| JP | 1144356 | 6/1989 |
| JP | 7087724 | 3/2011 |

OTHER PUBLICATIONS

Sugimoto, et al., "Development and Test of an Axial Flux TYpe PM Synchronous Motor with Liquid Nitrogen Cooled HTS Armature Windings", Journal of Physics: Conference Sseries, vol. 97, Conference 1, 2008, pp. 1-6.

Marignetti, et al., "On Liquid-Nitrogen-Cooled Copper-Wound Machines with Soft Magnetic Composite Core", IEEE Transactions on Industry Applications, vol. 45 Issue 3, pp. 984-992, May-Jun. 2010. Abstract attached.

* cited by examiner

*Primary Examiner* — Dang Le
(74) *Attorney, Agent, or Firm* — Ann M. Agosti

(57) ABSTRACT

The present application and the resultant patent provide a superconducting electrical machine. The superconducting electrical machine may include an armature coil made of a high temperature superconducting material, a cooling system, and a field coil. The cooling system may include a cryostat surrounding the armature coil and a foam insulation surrounding the cryostat.

20 Claims, 3 Drawing Sheets

ELECTRICAL MACHINE WITH SUPERCONDUCTING ARMATURE COILS AND OTHER COMPONENTS

TECHNICAL FIELD

The present application and the resultant patent relate generally to electrical machines and more particularly relate to superconducting electrical machines with armature winding coils and other components made from a high temperature superconducting material.

BACKGROUND OF THE INVENTION

Generally described, typical electrical machines such as motors and generators include a field coil mounted about a rotor and armature winding coils mounted about a stator. Once a voltage is applied, a magnetic field couples the field coil and the armature winding coils. The magnitude of the magnetic field depends upon the amount of current passing through the field coil. The magnetic stress within the electrical machine translates to torque so as to result in the rotation of the rotor. The higher the magnetic field, the greater the torque per rotation for a given circumference of the armature winding coils.

Using field coils made from a superconducting material makes the electrical machine more compact, light weight, and efficient due to the increased magnetic field strength caused by the superconducting material. Overall electrical machine performance also may be improved by increasing the current carrying capacity of the armature winding coils. Replacing the original copper coils with coils made from a superconducting material thus may significantly increase the overall power density by a factor of about two to five or more.

One issue with the use of known superconducting materials, however, includes excessive alternating current losses induced by the exposure to a strong alternative magnetic field. Although certain types of high temperature superconducting materials generally have lower alternating current losses, adequate and somewhat complicated cooling systems must be provided to maintain the superconducting material within the desired operating temperature range. Moreover, different design and operational issues may be found with air gap based coils and with tooth-wound coils and the like.

There is therefore a desire for an improved electrical machine using high temperature superconducting materials for either air gap or tooth-wound coil designs. Such improved electrical machine designs preferably may avoid large alternating current losses while providing a simplified cooling system. Moreover, such improved. designs preferably should provide a lightweight and compact shape with high operational efficiency.

SUMMARY OF THE INVENTION

The present application and the resultant patent thus provide a superconducting electrical machine The superconducting electrical machine may include an armature coil made of a high temperature superconducting material, a cooling system, and a field coil. The cooling system may include a cryostat surrounding the armature coil and a foam insulation surrounding the cryostat.

The present application and the resultant patent further provide a superconducting electrical machine. The superconducting electrical machine described herein may include an armature coil surrounding an iron tooth, a cooling system, and a field coil. The armature coil may be made out of a high temperature superconducting material. The cooling system may include a. vacuum insulated cryostat bonded to the iron tooth.

The present application and the resultant patent further provide a superconducting electrical machine. The superconducting electrical machine may include an armature coil in an air gap configuration, a cooling system, and a field coil, The armature coil may be made out of a high temperature superconducting material. The cooling system may include a foam insulation surrounding the armature coil.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
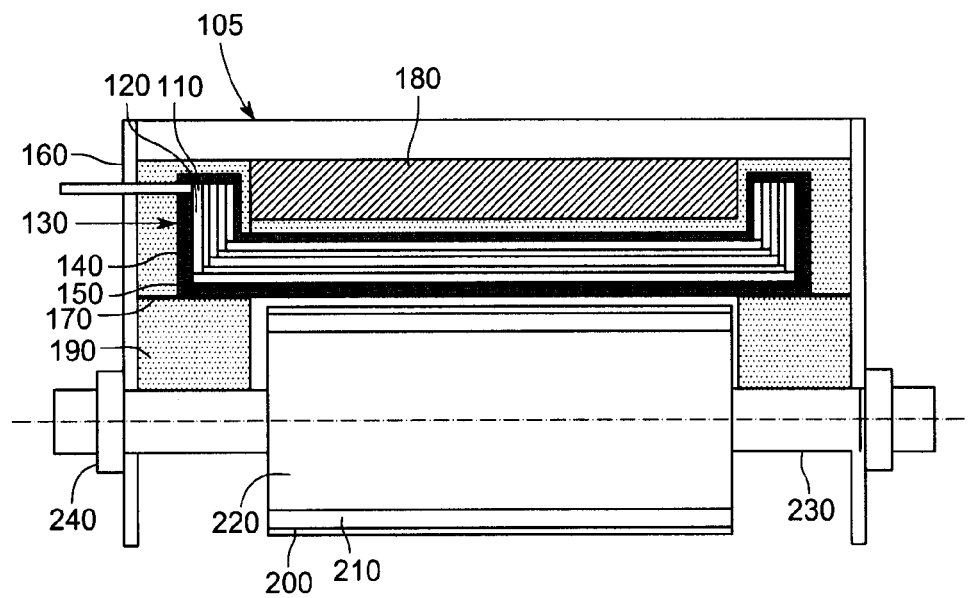
FIG. 1 is a schematic view of a superconducting electrical machine as may be described herein.
Figure 2:
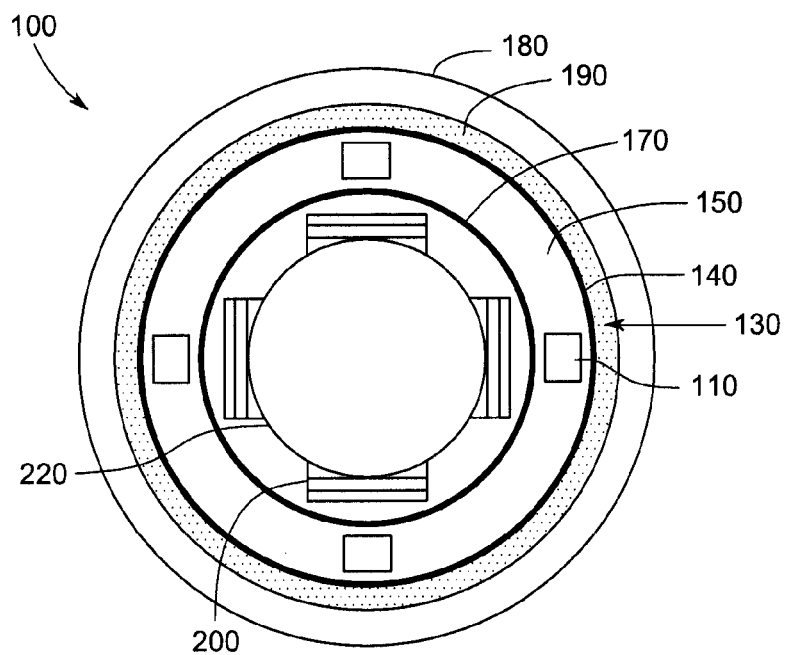
FIG. 2 is a cross-sectional view of the superconducting electrical machine of FIG. 1.

Referring now to the drawings, in which like numerals relate to like elements throughout the several views, FIG. 1 shows a superconducting electrical machine 100 as may be described herein. In this example, the superconducting electrical machine 100 may have an air gap design 105. The superconducting electrical machine 100 includes a high temperature superconducting armature coil 110. The high temperature superconducting armature coil may be made out of a high temperature superconducting material 120. The high temperature superconducting materials 120 may include, by way of example only, bismuth-strontium-calcium-copper-oxygen compounds such as BSCCO-2223 ($Bi_2Sr_2Ca_2Cu_3O_{10}$), BSCCO-2212 ($Bi_2Sr_2Ca_1Cu_2O_8$), $TlBa_2Ca_2Cu_3O_9$, $Tl_2Ba_2CaCu_2O_8$, $(TlPb)Sr_2CaCu_2O_7$, $(TlPb)Sr_2Ca_2Cu_3O_9$; yttrium barium copper oxide ($YBa_2Cu_3O_7$ and referred to as YBCO); magnesium diboride ($MgB_2$); and combinations thereof. Other types of high temperature superconducting materials 120 and combinations thereof may be used herein.

A high temperature superconducting cooling system 130 also may be used herein. The high temperature superconducting cooling system 130 may be positioned about the high temperature superconducting armature coil 110 so as to maintain the high temperature superconducting armature coil 110 within the desired operating temperature range. The high temperature superconducting cooling system 130 may include a cryostat 140 with a volume of liquid nitrogen 150 therein. Other types of cryogenic fluids and the like may be used herein. An external cyrocooler (not shown) may be used so as to chill the liquid nitrogen 150 or other types of fluids to the appropriate temperature. The cryostat 140 may be made out of composite materials. The cryostat 140 may be attached to a support frame 160 of the overall electrical machine 100 via a number of torque tubes 170. The torque tubes 170 may be made out of a high strength alloy, such as a titanium alloy and the like, so as to support the large torque generally experienced by the high temperature superconducting armature coil 110. Other components and other configurations may be used herein.

The high temperature superconducting cooling system 130 further may include a foam insulation 190. The foam insulation 190 may be applied between the cryostat 140 and the support frame 160. The foam insulation 190 may be used to reduce the heat load therein without requiring the use of conventional vacuum insulation and the like. Any type of conventional insulation may be used herein.

The superconducting electrical machine 100 further may include an iron yoke 180 positioned about the high temperature superconducting armature coil 110. The iron yoke 180 contains the magnetic flux therein. Other components and other configurations may be used herein.

The superconducting electrical machine 100 also may include a superconducting field coil 200. The superconducting field coil 200 may be made out of a superconducting material 210. The superconducting materials 210 may include the high temperature superconducting materials 120 described above as well as various types of low temperature superconducting materials such as niobium-titanium (NbTi), Niobium-tin ($Nb_3Sn$), combinations thereof, and the like. The superconducting field coil 200 may be positioned about a rotor 220 for rotation therewith. The rotor 220 may be positioned about a shaft 230. The shaft 230 may extend out of the support frame 160.

In order to cool the superconducting field coil 200, a cryogen transfer coupling 240 may be used. The cryogenic transfer coupling 240 may be positioned about the shaft 230 so as to provide liquid nitrogen or other type of cryogenic fluid to cool the superconducting field coil 200. Other components and other configurations may be used herein.

Figure 3:
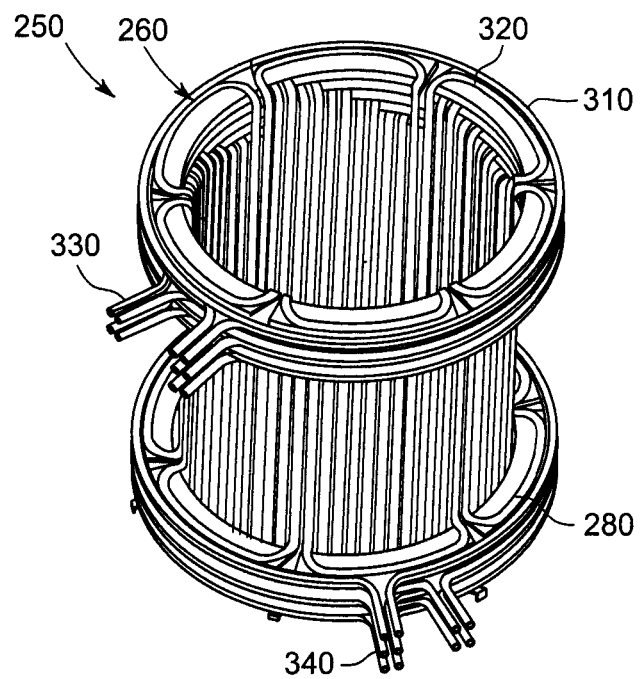
FIG. 3 is perspective view of an alternative embodiment of a. superconducting electrical machine as may be described herein
Figure 4:
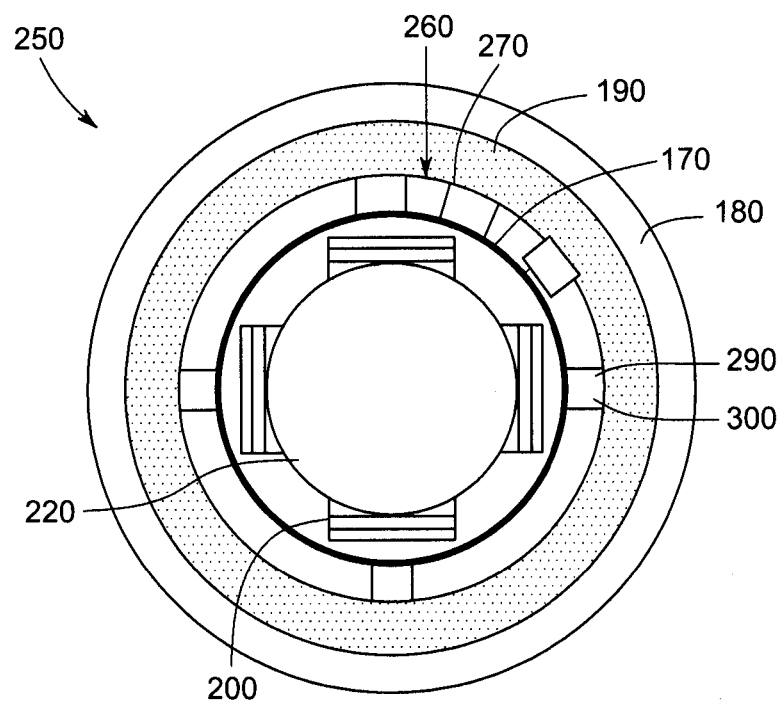
FIG. 4 is a side cross-sectional view of the superconducting electrical. machine of FIG. 3.

FIGS. 3 and 4 show an alternative embodiment of a superconducting electric machine 250 with a high temperature superconducting cooling system 260. Instead of the use of the cryostat 140, this example has a liquid nitrogen cooling tube 270 positioned between each coil bar 280 of a high temperature superconducting armature coil 290. Each coil bar 280 may be made out of a high temperature superconducting tape 300. The high temperature superconducting tape 300 may be a YBCO-type tape or other type of high temperature superconducting material 120. The liquid nitrogen cooling tube 270 may extend into a cooling pad 310 about an end winding area 320 of each of the coil bars 280. The liquid nitrogen 150 thus may flow from an inlet manifold 330 to an outlet manifold 340 so as to cool the entire high temperature superconducting armature coil 290. Other types of high temperature superconducting cooling systems 260 may be used herein with other components other configurations.

In use, the high temperature superconducting armature coil 110 of the air gap electrical machine 105 may be directly exposed to a strong magnetic field. Use of the high temperature superconducting material 120, however, limits alternating current losses such that the high temperature superconducting armature coil 110 may be adequately cooled via the high temperature superconducting cooling system 130. Moreover, the high temperature superconducting cooling system 130 may be simplified with the use of the foam insulation 190 given that the system heat load is negligible as compared to the alternating current losses.

Figure 5:
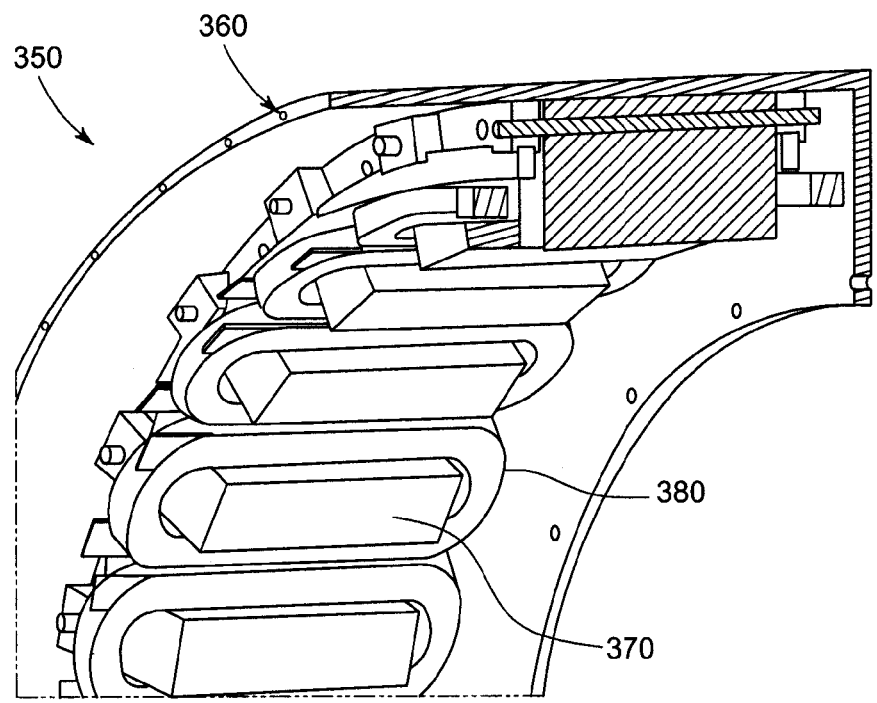
FIG. 5 is a partial perspective view of an alternative embodiment of a superconducting electrical machine as may be described herein.
Figure 6:
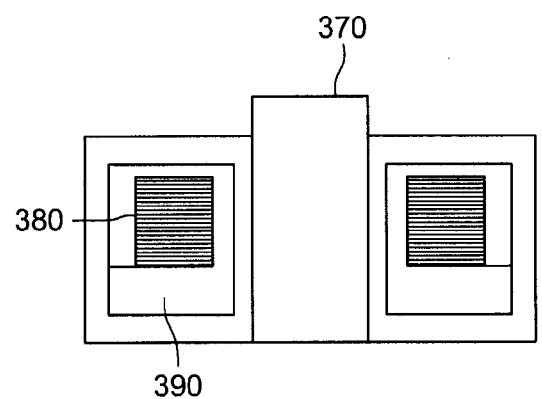
FIG. 6 is a cross-sectional view of a portion of the superconducting electrical machine of FIG. 5.

FIGS. 5 and 6 show an alternative embodiment of a superconducting electrical machine 350 as may be described herein. In this example, the superconducting electrical machine 350 may be a tooth-wound electrical machine 360. The tooth-wound electrical machine 360 may include a number of iron teeth 370. A high temperature superconducting armature coil 380 may be wound about each of the iron teeth 370. The high temperature superconducting armature coils 380 may be made out of the high temperature superconducting materials 120 described above and the like. Each of the high temperature superconducting armature coils 380 may be positioned in a vacuum insulated cryostat 390. The vacuum insulated cryostat 390 may be bonded to the iron tooth 370. Other types of cooling systems may be used herein. Liquid nitrogen 150 or other types of cryogenic fluids may be positioned therein so as to cool the high temperature superconducting armature coils 380. Other components and other configurations may be used herein.

In use, the magnetic field may be significantly reduced by concentrating the magnetic flux in the iron teeth 370 of the tooth wound electrical machine 360. As a result, the total alternating current losses induced in the high temperature superconducting armature coils 380 may be reduced.

The air gap design 105 thus provides the highest potential torque density and weight reduction. Due to the large alternating current magnetic field, there are alternating current losses. The high temperature superconducting cooling system 130, however, is very simple given the use of the foam insulation 190. Conversely, the tooth wound design 360 reintroduces the use of the iron teeth 370 and the overall weight thereof. The high temperature superconducting cooling system 130 also may be somewhat more complicated in the tooth-wound design 360 given the use of the vacuum insulated cryostat 390. The alternating current losses from the high temperature superconducting armature coils 380, however, are greatly reduced.

In either design, overall power density herein thus may be improved by a factor of about two to five or more by the use of the high temperature superconducting material 120 in the high temperature superconducting armature coils 110, 380. Moreover, the power density may be improved further through the use of the superconducting materials 120 for the superconducting field coil 200, The electrical machines described herein thus may be compact and light weight. Potential applications include low speed machines such as direct drive wind turbines, especially for high power rating offshore generators, electrical ship propulsion systems, and the like.

it should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A superconducting electrical machine, comprising:
   an armature coil;
   the armature coil comprising a high temperature superconducting material;
   a cooling system;
   the cooling system comprises a cryostat surrounding the armature coil and a foam insulation surrounding the cryostat; and
   a field coil.

2. The superconducting electrical machine of claim 1, wherein the armature coil comprises an air gap design.

3. The superconducting electrical machine of claim 1, wherein the high temperature superconducting material comprises bismuth-strontium-calcium-copper-oxygen compounds, yttrium barium copper oxide, magnesium diboride, and/or combinations thereof.

4. The superconducting electrical machine of claim 1, wherein the cryostat is attached to a frame by one or more torque tubes.

5. The superconducting electrical machine of claim 1, wherein the field coil comprises a superconducting material.

6. The superconducting electrical machine of claim 5, wherein the superconducting material of the field coil comprises the high temperature superconducting material.

7. The superconducting electrical machine of claim 1, wherein the cooling system comprises a cryogen transfer coupling positioned about the field coil.

8. The superconducting electrical machine of claim 1, wherein the armature coil comprises a plurality of coil bars and wherein the cooling system comprises a cooling tube positioned between each of the plurality of coil bars.

9. The superconducting electrical machine of claim 8, wherein the cooling system comprises a plurality of cooling pads extending from the plurality of cooling tubes.

10. The superconducting electrical machine of claim 8, wherein the plurality of coil bars comprises a high temperature superconducting tape.

11. A superconducting electrical machine, comprising:
an armature coil surrounding an iron tooth;
the armature coil comprising a high temperature superconducting material;
a cooling system;
the cooling system comprising a vacuum insulated cryostat bonded to the iron tooth; and
a field coil.

12. The superconducting electrical machine of claim 11, wherein the high temperature superconducting material comprises bismuth-strontium-calcium-copper-oxygen compounds, yttrium barium copper oxide, magnesium diboride, and/or combinations thereof.

13. The superconducting electrical machine of claim 11, further comprising a plurality of armature coils surrounding a plurality of iron teeth.

14. The superconducting electrical machine of claim 13, further comprising a plurality of vacuum insulated cryostat bonded to the plurality of iron teeth.

15. The superconducting electrical machine of claim 11, wherein the vacuum insulated cryostat comprises liquid nitrogen therein.

16. A superconducting electrical machine, comprising:
an armature coil;
the armature coil comprising an air gap configuration;
the armature coil comprising a high temperature superconducting material;
a cooling system;
the cooling system comprising a foam insulation surrounding the armature coil; and
a field coil.

17. The superconducting electrical machine of claim 16, wherein the high temperature superconducting material comprises bismuth-strontium-calcium-copper-oxygen compounds, yttrium barium copper oxide, magnesium diboride, and/or combinations thereof.

18. The superconducting electrical machine of claim 16, wherein the cooling system comprises a cryostat surrounding the armature coil.

19. The superconducting electrical machine of claim 16, wherein the field coil comprises a superconducting material.

20. The superconducting electrical machine of claim 16, wherein the cooling system comprises a cryogen transfer coupling positioned about the field coil.

* * * * *